United States Patent
Woodruff et al.

(10) Patent No.: US 9,742,701 B2
(45) Date of Patent: Aug. 22, 2017

(54) ATTACHMENT UNIT INTERFACES FOR NON-IDENTICAL DATA RATE LINKS

(71) Applicant: BROADCOM CORPORATION, Irvine, CA (US)

(72) Inventors: William Calvin Woodruff, Pleasanton, CA (US); Alan Kwentus, Coto de Caza, CA (US); Chao Lin, Irvine, CA (US); Richard Dale Tidstrom, Boulder, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 97 days.

(21) Appl. No.: 14/462,498

(22) Filed: Aug. 18, 2014

(65) Prior Publication Data

US 2015/0172223 A1  Jun. 18, 2015

Related U.S. Application Data

(60) Provisional application No. 61/916,702, filed on Dec. 16, 2013, provisional application No. 62/023,766, filed on Jul. 11, 2014.

(51) Int. Cl.
*H04L 12/28* (2006.01)
*H04L 12/935* (2013.01)
*H04L 12/931* (2013.01)

(52) U.S. Cl.
CPC ............ *H04L 49/30* (2013.01); *H04L 49/352* (2013.01); *H04L 49/356* (2013.01)

(58) Field of Classification Search
None
See application file for complete search history.

(56) References Cited

U.S. PATENT DOCUMENTS

2002/0176430 A1\* 11/2002 Sangha ................... H04L 49/90
                                                                     370/412
2005/0030898 A1\*  2/2005 Furlong et al. ............... 370/236
(Continued)

OTHER PUBLICATIONS

Patrick B. Billings, PHY-less Ethernet Implementation using Freescale Power Architecture Based Microprocessors, Jun. 24, 2010, Freescale, all.\*

(Continued)

*Primary Examiner* — Omar Ghowrwal
*Assistant Examiner* — Angel Brockman
(74) *Attorney, Agent, or Firm* — McDermott Will & Emery LLP

(57) ABSTRACT

An apparatus for operating a low data-rate (LDR) link and legacy switch at a high data-rate (HDR) includes a first block and a second block. The first block receives input signals from the legacy switch and generates identical output signals. The second block receives the identical output signals and generates an HDR signal for communication over the LDR link coupled to an access point. Further, a media access control (MAC) interface communicates data at a first data rate with an Ethernet PHY block including a first-in-first-out (FIFO) module and a buffer. The FIFO receives data from the MAC interface at the first data rate and transmits data at a second data rate. The buffer receives data from the Ethernet port at the second data rate and transmits the received data at the first data rate in response to detection of an end of packet.

20 Claims, 5 Drawing Sheets

(56) References Cited

U.S. PATENT DOCUMENTS

| | | | | |
|---|---|---|---|---|
| 2005/0097378 A1* | 5/2005 | Hwang | .......................... | 713/320 |
| 2006/0062229 A1* | 3/2006 | Lee et al. | ...................... | 370/401 |
| 2007/0008991 A1* | 1/2007 | Sridharan et al. | ............ | 370/474 |
| 2008/0069570 A1* | 3/2008 | Dallesasse | ................... | 398/139 |
| 2012/0300792 A1* | 11/2012 | Patel et al. | .................... | 370/476 |
| 2014/0362865 A1* | 12/2014 | Chini | ................. | H04L 12/6418 |
| | | | | 370/401 |

OTHER PUBLICATIONS

Illango Ganga et al., IEEE 802.3 architecture and 40/100 GBE , Nov. 13, 2007, Force 10 Networks, all.*
V.R.Gad et al, Implementation of Gigabit Ethernet Standard Using FPGA, Aug. 2012, vol. 2, IJMNCT, all.*

* cited by examiner ies and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

ATTACHMENT UNIT INTERFACES FOR NON-IDENTICAL DATA RATE LINKS

CROSS-REFERENCE TO RELATED APPLICATIONS

This application claims the benefit of priority under 35 U.S.C. §119 from U.S. Provisional Patent Application Nos. 61/916,702 filed on Dec. 16, 2013, and 62/023,766 filed on Jul. 11, 2014, which are incorporated herein by reference in its entirety.

TECHNICAL FIELD

The subject technology generally relates to Ethernet communications, in particular, relates to application user interfaces for non-identical data rate links.

BACKGROUND

Many Ethernet networks use standard data rates such as 1 Gb/sec and 10 Gb/sec. With the introduction of new higher data rates, often the recommended media required to operate at higher data rates can change. For example, a link that is installed and can operate at 1 Gb/sec uses a category 5e (Cat5e) cable. However, the next higher IEEE data rate of 10 Gb/sec requires category 6a (Cat6a) cabling. For some applications such as enterprise wireless access points (EWAP), it may not be practical to replace the cables. For instance, when such EWAP units need to operate at data rates above 1 Gb/sec, but below the next Standard Ethernet rate of 10 Gb/sec. Therefore, it is desirable to upgrade all existing 1 Gb/sec links for some faster data rate without upgrading the cable. For such applications, a higher data rate such as 2.5 Gb/sec can be run on the existing Cat5e cable using a non-IEEE standard version of the higher speed 10 Gb/sec standard (e.g., 10GBASE-T).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

Methods and implementations for providing user interfaces (UIs) for non-IEEE standard data rate links are described. In one or more implementations, the subject technology can create an attachment unit interface (AUI) based on a higher-speed interface (e.g., 10 Gb/sec) in conjunction with a 2.5 Gb/sec link, which can run on existing Cat5e cables using a non-IEEE standard version of the higher speed (e.g., 10 Gb/sec) standard (e.g., 10GBASE-T). The advantageous features of the subject technology include permitting the market to introduce an intermediate rate Ethernet PHY, for example, at 2.5 Gb/sec, without the necessity of the balance of the infrastructure to have AUI interfaces at that rate. For instance, with the disclosed technology, switches and MACs with gigabit Ethernet (GE) or 10GE interfaces can use a new 2.5 Gb/sec Ethernet PHY.

Figure 1A:
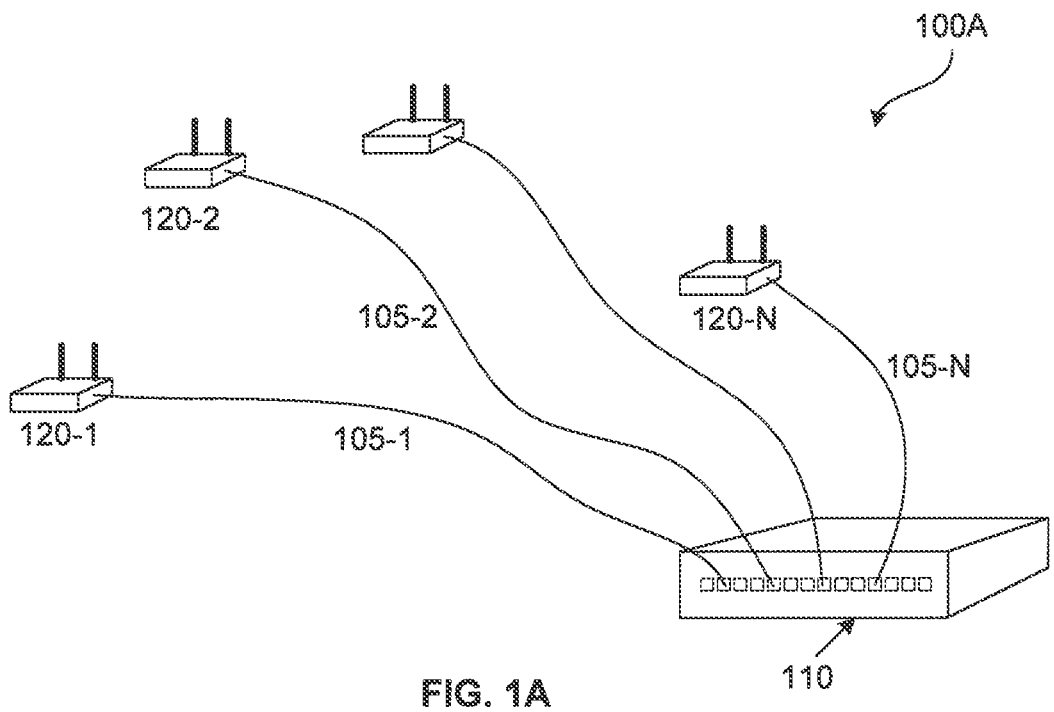
FIGS. 1A-1B illustrate examples of a gigabit Ethernet (GE) environment and an upgrade configuration.
Figure 1B:
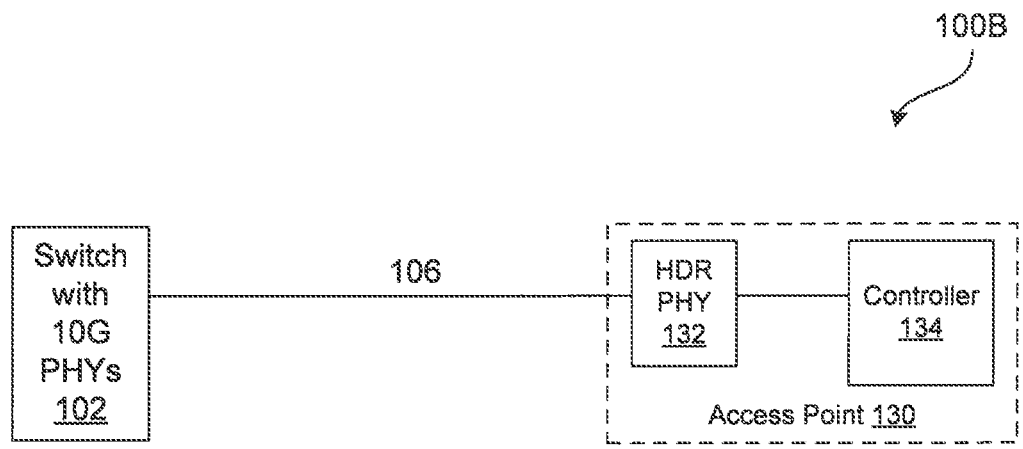

FIGS. 1A-1B illustrate examples of a gigabit Ethernet (GE) environment 100A and an upgrade configuration 100B. The GE environment 100A includes, for example, an Ethernet switch 110 (e.g., a legacy GE switch, hereinafter "switch 110") communicating with a number of devices 120 (e.g., access points 120-1 to 120-N) via links 105 (e.g., Ethernet links 105-1 to 105N). The switch 110 is a low data-rate (LDR) (e.g., 1 Gb/sec) legacy switch, and the access points 120 are LDR access points. The links 105 can be Cat5e type cables, which are installed as parts of the existing Ethernet infrastructure of a user site such and enterprise user. If the user decides to upgrade to a higher data rate (e.g., 2.5 Gb/sec or more), the existing solution is to install new HDR cables (e.g., Cat6 or higher data-rate cables) as well upgrade the switch 110 to an HDR switch. For example, in the upgrade configuration 100B, the switch 102 is a high data-rate switch (e.g., with a 10 Gb/sec PHY) and the link 106 is an HDR (e.g., 10 Gb/sec, such as Cat6a) cable and connects the switch 102 to an HDR access point 130. The HDR access point includes a HDR PHY 132 and a controller 134. This solution, although works for its intended purpose, but is not as cost effective and convenient as the subject solution disclosed herein.

Figure 2A:
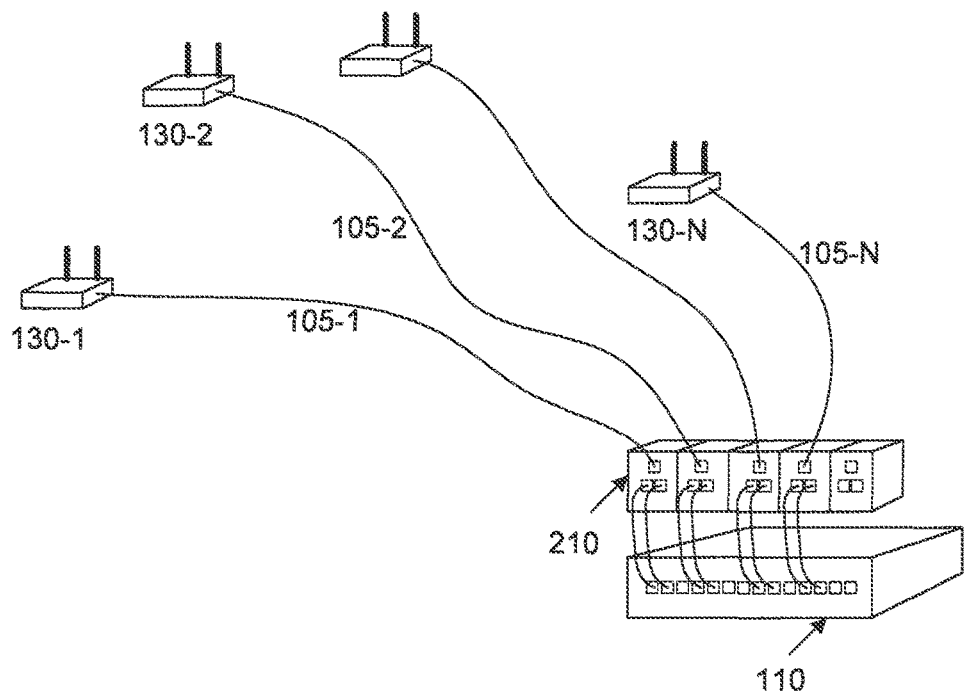
FIG. 2A illustrates an example of an apparatus for operating a low data-rate (LDR) link and legacy switch at a high data-rate (HDR) in accordance with one or more implementations.

FIG. 2A illustrates examples of an apparatus 210 for operating a low data-rate (LDR) link 105 and legacy switch 110 at a high data-rate in accordance with one or more implementations of the subject technology. In one or more implementations, the subject solution allows a user to deploy a number of HDR (e.g., 2.5 Gb/sec) access points 130 (e.g., 130-1 to 130-N) in a cost-effective way. This is because the solution can function with the legacy switch 110 and without changing the links 105 (e.g., Cat5e or higher data-rate cables) to HDR cables. This is made possible by using the apparatus 210 (e.g., an external converter such as an attachment unit interface (AUI)) of the subject technology.

A slice of the apparatus 210 may include multiple channels (e.g., ports), where each channel can convert two input lines from the switch 110 to a single output that is correctable to any of the links 105, as described in more detail below. The apparatus 210 may include more than one slice, and can be configured in a number of ways to leverage multiple ports of the switch 110. An advantageous feature of the subject technology is that the disclosed solution preserves power over Ethernet (POE). For example, each channel of the apparatus 210 receives two POE lines from the legacy switch 110 and provides a single POE output.

Figure 2B:
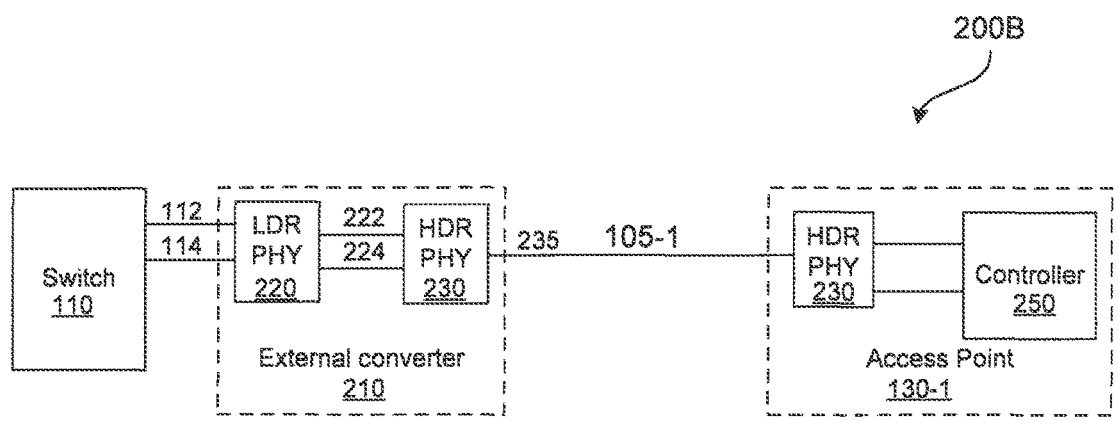
FIGS. 2B through 2C illustrate examples of implementation details of the apparatus of FIG. 2A in accordance with one or more implementations.
Figure 2C:
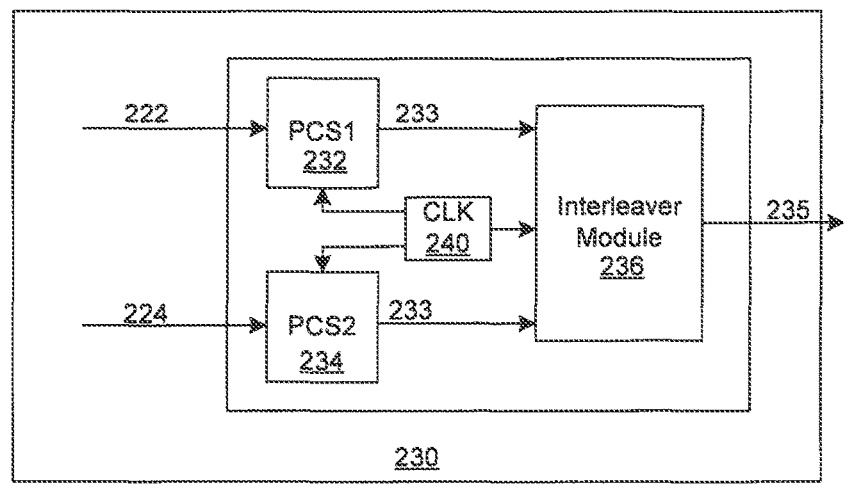

FIGS. 2B through 2C illustrate examples of implementation details of the apparatus 210 of FIG. 2A in accordance with one or more implementations. In the example implementation 200B shown in FIG. 2B, each channel of the apparatus 210 is shown to include a first block 220 and a second block 230. The first block is only necessary if the switch 110 embodies 1000BASE-T PHYs. The first block 220 is an LDR PHY and can convert the received 1000BASE-T signals (e.g., identical signals 112 and 114), and create signals 222 and 224 to communicate to the second block 230. In one or more implementations, signals 222 and 224 are identical signals and include gigabit media independent interface (GMII) or serial GMII (SGMII) signals, which in case where switch 110 embodies a legacy GE switch, are received directly from the switch 110. The SGMII signals uses 8 bit-to-10 bit encoding so that every 8 bits of data is expanded into 10 bits. In other words, an internal 1 Gb/sec data rate of the switch 110 is converted to a 1.25 Gb/sec data rate, such that each of identical signals 112 and 114 is provided to the first block 220 at a 1.25 Gb/sec.

The second block 230 receives output signals 222 and 224 from the first block 220 and generates an HDR signal 235 for communication over the LDR link (e.g., 105-1) coupled to an access point 130-1. In some aspects, the first block 220 includes a dual-port LDR Ethernet PHY and the second block 230 includes an HDR Ethernet PHY. Example values for the LDR and the HDR are 1 Gb/sec and 2.5 Gb/sec, respectively. In some aspects, the LDR link 105-1 includes one of a Cat5e or a higher data-rate cable (e.g., a Cat6 or a Cat6a cable). The access point 130-1 is a known access point including a HDR PHY block 230 and a controller 250 (e.g., including a media-access control (MAC) block).

FIG. 2C shows an example implementation of the HDR PHY 230. In one or more implementations, the HDR PHY 230 includes physical coding sub-layer (PCS) modules 232 and 234 and an interleaver module 236. The PCS modules 232 and 234 can align the identical output signals 222 and 224 of the first block 220. The interleaver module 236 generates the HDR signal 235 based on the aligned identical output signals 233 of the PCS modules 232 and 234 by interleaving the two LDR signals (e.g., 233). The interleaver module 236 interleaves the two LDR signals 233 at the bit, byte, or otherwise comparable intervals. The aligned identical output signals 233 include two GMII or SGMII signals.

Figure 3A:
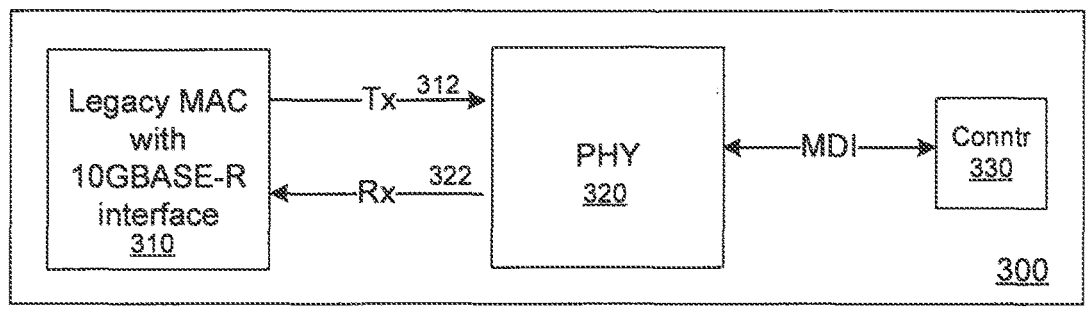
FIGS. 3A-3B illustrate an example architecture of an apparatus and a corresponding PHY circuit in accordance with one or more implementations.
Figure 3B:
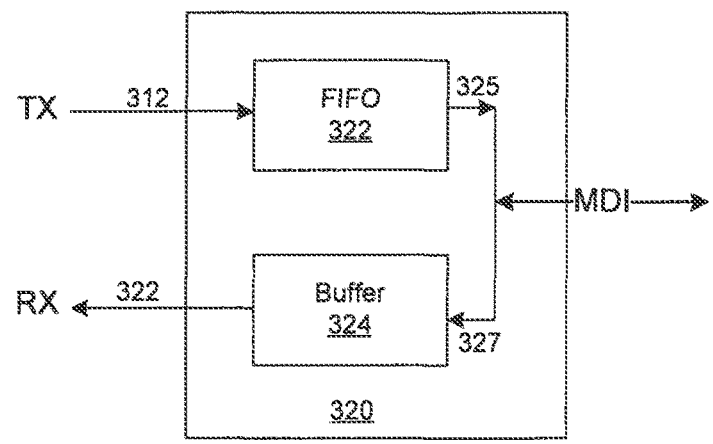

FIGS. 3A-3B illustrate an example architecture of an apparatus 300 and a corresponding PHY circuit 320 in accordance with one or more implementations of the subject technology. Examples of the apparatus 300 include a port of a switch or an access point. In one or more implementations, the apparatus 300 includes a media access control (MAC) interface 310 that communicates data at a first data rate, and an Ethernet PHY block 320 that is connected to an Ethernet port (e.g., a connector) 330 via a medium-dependent interface (MDI). The Ethernet PHY block 320, as shown in FIG. 3B, includes a first-in-first-out (FIFO) module 322 and a buffer 324.

The FIFO module 322 receives data 312 from the MAC interface 310 at the first data rate and transmits data 325 to the Ethernet port 330 at a second data rate. The first data rate is higher than the second data rate and at least one of the first and the second data rates are non-standard rates (e.g., not specified by a standard body). Examples of the first data rate and the second data rate include 10 Gb/sec and 2.5 Gb/sec, respectively. Because the first data rate is higher than the second data rate, the extra time associated with each period of the second data rate is accommodated by extending the inter packet gap (IPG). In one or more implementations, the buffer 324 receives data 327 from the Ethernet port 330 at the second data rate, and transmits data 322 to the MAC interface at the first data rate. In some implementations, the buffer 324 starts transmission of the data 322 after detection of an end of the packet in the received data 327. In some aspects, the wait time before starting the transmission of the data 322 depends on the data rate and can vary between one half to three fourth of the package length. In some implementations, the buffer 324 achieves the higher rate by filling the IPGs of the received data 327 with idle characters. The subject technology, as described above, allows a high data-rate (e.g., 10 Gb/sec) switch such as a 10GBASE-R (Clause 49 in IEEE802.3) switch to be coupled to a PHY circuit via a low data-rate (e.g., 2.5 Gb/sec) cable.

Figures 4, 5:
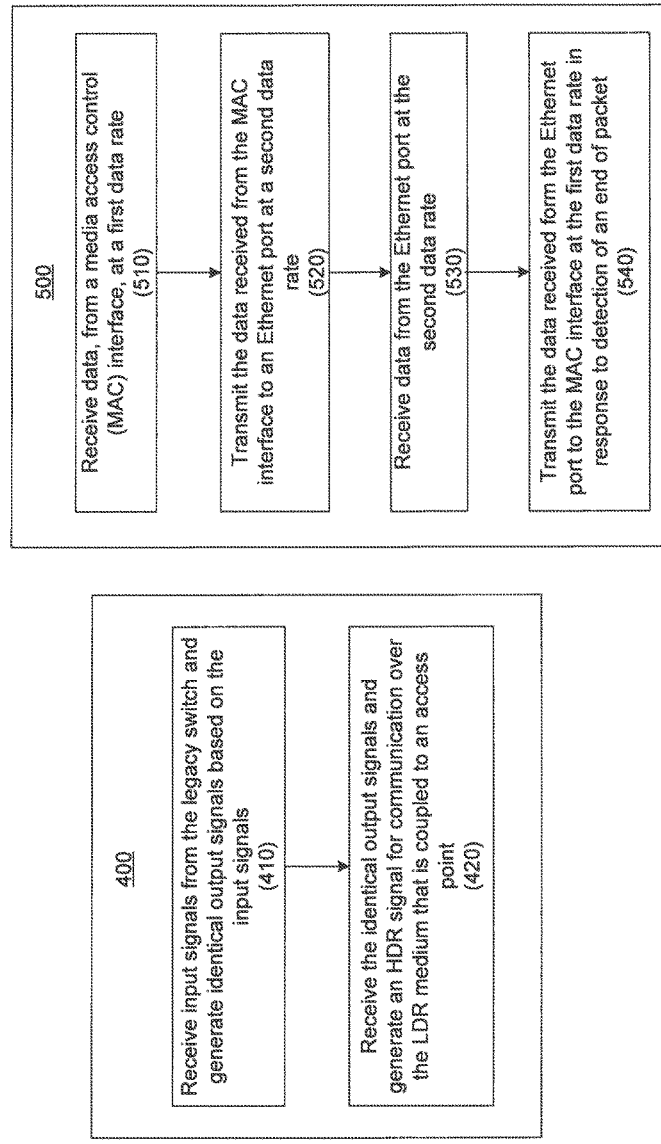
FIG. 4 illustrates an example of a method for operating an LDR link and a switch at a high data-rate in accordance with one or more implementations.
FIG. 5 illustrates an example of a method for switching data rates in an Ethernet device in accordance with one or more implementations.

FIG. 4 illustrates an example of a method 400 for operating an LDR link and a switch at a high data-rate in accordance with one or more implementations of the subject technology. For explanatory purposes, the blocks of the example method 400 are described herein as occurring in serial, or linearly. However, multiple blocks of the example method 400 can occur in parallel. In addition, the blocks of the example method 400 need not be performed in the order shown and/or one or more of the blocks of the example method 400 need not be performed.

The method 400 includes receiving input signals (e.g., 112 and 114 of FIG. 2B) from the legacy switch (e.g., 110 of FIG. 2B) and generating identical output signals (e.g., 222 and 224 of FIG. 2B) based on the input signals (410). The identical output signals are received and an HDR signal (e.g., 235 of FIG. 2B) is generated for communication over the LDR link (e.g., 105-1 of FIG. 2B) that is coupled to an access point (e.g., 130-1 of FIG. 2B) (420).

FIG. 5 illustrates an example of a method 500 for switching data rates in an Ethernet device in accordance with one or more implementations of the subject technology. For explanatory purposes, the blocks of the example method 500 are described herein as occurring in serial, or linearly. However, multiple blocks of the example method 500 can occur in parallel. In addition, the blocks of the example method 500 need not be performed in the order shown and/or one or more of the blocks of the example method 500 need not be performed.

The method 500 includes receiving data (e.g., 312 of FIG. 3A), from a media access control (MAC) interface (e.g., 310 of FIG. 3A), at a first data rate (510). The data received from the MAC interface is transmitted (e.g., by 320 of FIG. 3A) to an Ethernet port (e.g., 330 of FIG. 3A) at a second data rate (520). Data from the Ethernet port is received at the second data rate (530). The data received from the Ethernet port is transmitted (e.g., by 320 of FIG. 3A) to the MAC interface at the first data rate in response to detection of an end of packet (540). The first data rate is higher than the second data rate.

Figure 6:
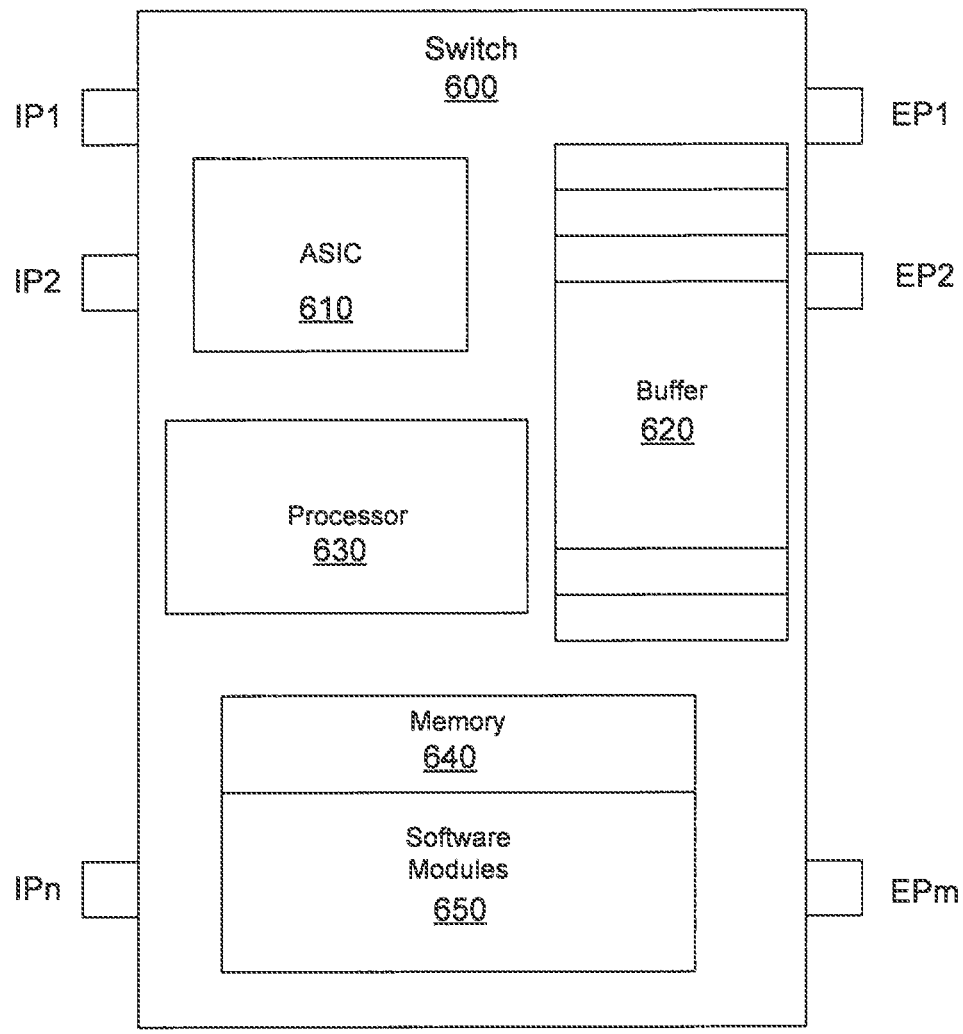
FIG. 6 illustrates an example of a communication device using features of the subject technology in accordance with one or more implementations.

FIG. 6 illustrates an example of a communication device 600 employing features of the subject technology in accordance with one or more implementations of the subject technology. Examples of the communication device 600 includes an Ethernet switch (e.g., switch 110 of FIG. 2A) of an Ethernet network such as a private network including a data-center network, an enterprise network, or other private networks. The communication device 600 includes a number of ingress (input) ports IP1-IPn and multiple egress (output) ports EP1-EPm. In one or more implementations, one or more of the ingress ports IP1-IPn can receive a data packet from another switch or and endpoint device of the network. The communication device 600 further includes a hardware component such as an application specific integrated circuit (ASIC) 610 (which in some embodiments can be implemented as a field-programmable logic array (FPGA)), a buffer 620, a processor 630, memory 640, and a software module 650.

In some implementations, the ASIC 610 can include suitable logic, circuitry, interfaces and/or code that can be operable to perform functionalities of a PHY circuit. The buffer 620 includes suitable logic, circuitry, code and/or interfaces that are operable to receive and store and/or delay a block of data for communication through one or more of the egress ports EP1-EPm. The processor 630 includes suitable logic, circuitry, and/or code that can enable processing data and/or controlling operations of the communication device 600. In this regard, the processor 630 can be enabled to provide control signals to various other portions of the communication device 600. The processor 630 also controls transfers of data between various portions of the communication device 600. Additionally, the processor 630 can enable implementation of an operating system or otherwise execute code to manage operations of the communication device 600.

The memory 640 includes suitable logic, circuitry, and/or code that can enable storage of various types of information such as received data, generated data, code, and/or configuration information. The memory 640 includes, for example, RAM, ROM, flash, and/or magnetic storage. In various embodiment of the subject technology, the memory 640 includes a RAM, DRAM, SRAM, T-RAM, Z-RAM, TTRAM, or any other storage media. The memory 640 can include software modules 650 that when executed by a processor (e.g., processor 630) can perform some or all of the functionalities of the ASIC 610. In some implementations, the software modules 650 include codes that when executed by a processor can perform functionalities such as configuration of the communication device 600.

In some implementations, the commutation device 600 comprises a high data-rate (e.g., 2.5 Gb/sec) switch and is deployed along with the external converter 210 of FIG. 2A to connect to high data-rate access points (e.g., 130 of FIG. 2A) using the existing cables (e.g., 105 of FIG. 2A). In one or more implementations, the commutation device 600 includes a PHY circuit (e.g., 320 of FIG. 3A) that can receive data at a high rate from a legacy MAC interface (e.g., 10GBASED-R) and provide the data at a low rate to a connector. The PHY circuit can further receive data at the low rate from the connector and provide the data at the high rate to the MAC interface.

In some implementations, the operation at any rate between the two standards rates (e.g., the rate of 2.5 Gb/sec quoted in this disclosure) can be facilitated by the subject technology. For example, the subject technology can be used at rates between 1 Gb/sec and 10 Gb/sec, even at non-integer multiples (e.g., 4.5 Gb/sec).

In some implementations, the lower data-rate 2xGE symbol-interleaving concept can apply for any number of lower data-rate GE interfaces, such as 3x or 4x. Also, while the disclosed technology states interleaving of symbols, the subject technology can apply for bit, byte, or 9-bit word interleaving.

It is understood that related technologies align the AUI interface to the line rate, for example, 10 G PHYs have 10 G AUI interfaces, 1 G PHYs have 1 G AUI interfaces, etc. However, when/if a new rate is introduced that is between two IEEE standard rates, the existing infrastructure cannot be developed with AUI interfaces at that rate. For instance, in the case of 2.5 Gb/sec, there are no IEEE standard AUI interfaces available. Therefore, there is benefit to have a method to utilize such non-standard rate in a PHY with industry standard interfaces at either a higher or a lower data rate I/O.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus for operating a low data-rate (LDR) link and legacy switch at a high data-rate (HDR), the apparatus comprising:
    a first block comprising an LDR Ethernet PHY to receive input signals from the legacy switch and to generate identical gigabit media independent interface (GMII) output signals; and
    a second block to receive the identical GMII output signals from the first block and to generate an HDR signal for communication over the LDR link coupled to an access point, wherein the second block comprises physical coding sub-layer (PCS) modules to align the identical output signals and an interleaver module to interleave the aligned identical output signals.

2. The apparatus of claim 1, wherein the legacy switch comprises a 1000BASE-T Ethernet physical layer (PHY) interface.

3. The apparatus of claim 1, wherein the first block comprises a dual-port LDR Ethernet PHY.

4. The apparatus of claim 1, wherein the second block comprises an HDR Ethernet PHY, and wherein the identical output signals comprise gigabit media independent interface (GMII) or serial GMII (SGMII) signals.

5. The apparatus of claim 1, wherein the legacy switch comprises a legacy gigabit Ethernet (GE) switch, wherein the identical output signals comprise GMII or serial SGMII signals, and wherein the second block is to receive GMII or serial SGMII signals from the legacy GE switch.

6. The apparatus of claim 1, wherein the LDR comprises 1 Gb/sec and the HDR comprises 2.5 Gb/sec, and wherein the LDR link comprises one of a Cat5e or a higher data-rate cable.

7. The apparatus of claim 1, wherein the interleaver module is to generate the HDR signal based on the aligned identical output signals by interleaving the two LDR signals at intervals including bit intervals or byte intervals, and wherein the aligned identical output signals comprise two GMII or SGMII signals.

8. An apparatus comprising:
    a media access control (MAC) interface to communicate data at a first data rate; and
    an Ethernet PHY block including a first-in-first-out (FIFO) module coupled to a buffer,
    wherein the FIFO is to receive data from a transmit (TX) port of the MAC interface at the first data rate and to transmit data to a medium-dependent interface (MDI) port at a second data rate, wherein the buffer is to receive data from the MDI port at the second data rate, and to transmit the received data to a receive (RX) port of the MAC interface at the first data rate that is higher than the second data rate, in response to detection of an end of packet.

9. The apparatus of claim 8, wherein at least one of the first and the second data rates are non-standard, and wherein the first data rate comprises 10 Gb/sec and the second data rate comprises 2.5 Gb/sec, and wherein the MAC interface comprises a 10GBASE-R attachment-unit interface (AUI).

10. The apparatus of claim 8, wherein the FIFO is to transmit data to the Ethernet port at a lower rate by extending inter-packet gaps (IPGs).

11. The apparatus of claim 8, wherein the buffer is to transmit the received data to the MAC interface at the first data rate by filling the IPGs with idle characters.

12. A method for operating a low data-rate (LDR) link and a legacy switch at a high data-rate (HDR), the method comprising:
    receiving input signals from the legacy switch and generating identical gigabit media independent interface (GMII) output signals based on the input signals; and
    receiving the identical (GMII) output signals and generating an HDR signal, for communication over the LDR link that is coupled to an access point, wherein generating the HDR signal comprises aligning of the identical output signals by physical coding sub-layer (PCS) modules and interleaving the aligned identical output signals using an interleaver module.

13. The method of claim 12, receiving the input signals from the legacy switch comprises receiving input signals from a 1000BASE-T Ethernet physical layer (PHY) interface.

14. The method of claim 13, wherein generating identical output signals comprises using a dual-port LDR Ethernet PHY.

15. The method of claim 12, wherein generating the HDR signal comprises using an HDR Ethernet PHY, and wherein the identical output signals comprise gigabit media independent interface (GMII) or serial GMII (SGMII) signals.

16. The method of claim 12, wherein the legacy switch comprises a legacy gigabit Ethernet (GE) switch, wherein the identical output signals comprise GMII or serial SGMII signals, and wherein receiving the GMII or serial SGMII signals comprises receiving the GMII or serial SGMII signals from the legacy GE switch.

17. The method of claim 12, wherein the method further comprises configuring the interleaver module to generate the HDR signal based on the aligned identical output signals by interleaving the two LDR signals at intervals including bit intervals or byte intervals, and wherein the aligned identical output signals comprise two GMII or SGMII signals.

18. A method comprising:
    receiving data, from a media access control (MAC) interface, at a first data rate;

transmitting the data received from the MAC interface to a medium-dependent interface (MDI) port at a second data rate;

receiving data from a transmit (TX) port of the Ethernet port at the second data rate; and transmitting the data received from the MDI port to a receive (RX) port of the MAC interface at the first data rate that is higher than the second data rate, in response to detection of an end of packet.

19. The method of claim 18, wherein at least one of the first and the second data rates are non-standard, and wherein the first data rate comprises 10 Gb/sec and the second data rate comprises 2.5 Gb/sec, and wherein the MAC interface comprises a 10GBASE-R attachment-unit interface (AUI).

20. The method of claim 19, wherein transmitting data to the Ethernet port at the second data-rate is achieved by extending inter-packet gaps (IPGs), and wherein transmitting the data received from the Ethernet port to the MAC interface at the first data-rate comprises filling the IPGs with idle characters.

* * * * *